United States Patent

Luttgeharm et al.

Patent Number: 6,086,161
Date of Patent: Jul. 11, 2000

[54] HIGH PERFORMANCE BROAD APPLICATION WHEEL

[75] Inventors: Clint Luttgeharm, Wichita, Kans.; David Nayer, Austin, Tex.

[73] Assignee: Nimble Bicycle Company, Austin, Tex.

[21] Appl. No.: 08/878,392

[22] Filed: Jun. 18, 1997

[51] Int. Cl.$^7$ .................................................. B60B 21/00
[52] U.S. Cl. ........................... 301/95; 301/64.7; 301/104
[58] Field of Search ................... 301/64.1, 64.7, 301/95, 96, 97, 98, 104

[56] References Cited

U.S. PATENT DOCUMENTS

| | | | |
|---|---|---|---|
| 697,118 | 4/1902 | Van Horn | 301/96 |
| 4,793,659 | 12/1988 | Oleff et al. | 301/95 X |
| 4,930,843 | 6/1990 | Lewis | 301/64.7 |
| 4,995,675 | 2/1991 | Tsai | 301/64.7 |
| 5,246,275 | 9/1993 | Arredondo, Jr. | 301/64.7 |
| 5,350,221 | 9/1994 | Pearce et al. | 301/104 |
| 5,415,463 | 5/1995 | Olson et al. | 301/104 X |
| 5,540,485 | 7/1996 | Enders | 301/64.7 |

Primary Examiner—Russell D. Stormer
Attorney, Agent, or Firm—J. Nevin Shaffer, Jr.; Shaffer & Culbertson, LLP

[57] ABSTRACT

A wheel (10) with a rim (12) and at least one spoke (14) includes a rim (12) wherein the depth of the rim (12) varies circumferentially around the rim (12). At least one spoke (14) with a first end (16) connected to the rim (12) and a second end (18) connected to a wheel hub (20) is provided wherein the cross-section of the spoke (14) varies from the first end (16) to the second end (18). The rim (12) depth varies circumferentially so that the depth is greater between the spokes (14) and less at the spokes (14). Further, the spoke (14) cross-section is symmetrical at the second end (18) connected to the wheel hub (20) and asymmetrical at the first end (16). The asymmetrical shape of the first end (16) is preferably an ellipse with a leading edge ellipse (30) shape that is constant from the first end (16) to the second end (18) and a trailing edge ellipse shape (32) that is the same dimension as the leading edge (30) at the second end (18) and thereafter decreases in dimension from the second end (18) to the first end (16). Further, in a preferred embodiment, the rim (12), and/or spoke(s) (14), is a hollow structure manufactured from multiple nested, tubular braids (40), (41) and (42).

12 Claims, 7 Drawing Sheets

HIGH PERFORMANCE BROAD APPLICATION WHEEL

BACKGROUND OF THE INVENTION

This invention relates to an improved high performance, broad application wheel in general. In particular, this invention relates to an improved high performance, broad application wheel for bicycles.

The search for better performance is endemic in every industry and the industry concerning the creation of high performance wheels is no exception. In particular, in the bicycle industry, a parade of innovations has seemingly addressed every aspect of wheel design. For example, Lipeles, U.S. Pat. No. 5,549,360 discloses a minimum weight wheel rim; Enders, U.S. Pat. No. 5,540,485 discloses a composite bicycle wheel having opposing spokes radiating from a central hub. Various other spoke wheel apparatus and methods for creating composite spoke wheels are set forth in U.S. Pat. Nos. 5,246,275; 5,184,874, 5,104,199; 5,061,013; 4,995,675; 4,930,844; and 4,930,843, for example. Without exception, prior art wheels have two common features. The first common feature in prior art wheels is that the rim depth is universally constant. The second universal feature of prior art wheels is that the spokes have a constant, cross-sectional shape.

A significant portion of the aerodynamic drag of a bicycle and rider in motion is created by the wheels. This problem has long been recognized and has been the subject of significant technical investigation and improvement. The drag associated with the wheel can be divided into two parts: spoke drag and rim drag.

Traditional tension wire spoke wheel designs optimized for minimum aerodynamic drag generally have an aerodynamically contoured rim and as few spokes as possible. The number of spokes is limited by the structure requirements of the tension wheel design. To further decrease the spoke drag, these spokes are often of a non-circular (elliptical) constant cross-section with the exception of the circular region retained for attachment of the spoke ends. Rim drag is minimized by use of an aerodynamically contoured rim with different designs utilizing depths of from 2 to 5 tire diameters; however, the depth is universally constant with any given prior art design.

Modern "aero" wheels utilize a reduced number (3, 4, or 5) of non-tension spokes. These spokes are capable of sustaining both bending and compression loads in addition to tensile loads. The larger cross-sections of these spokes are generally an aerodynamic contour of constant form and proportion. Some wheels have been fabricated using varying proportions of a constant formed spoke from the hub to the rim. The rim sections incorporated in these rims are of constant aerodynamic cross-section. While different designs utilize depths of from 2 to 5 tire diameters, the depth is universally constant within any given design.

The designs of all of these wheels attempt to obtain maximum performance for a given rider's capabilities. Directly measurable parameters of this performance include apparent and rotational drag, cross wind drag, rotational moment of inertia, and mass. Less tangible performance parameters of any given design are the comfort and feel of the wheel.

The inventors have determined that the local velocity profiles for a rotating wheel contain a significant region of flow reversal relative to the intended flow direction over the spokes. Additionally, the inventors determined that the sharp, trailing edge of conventional prior art designs produces separation and increased drag in this region of reverse flow. These effects are most pronounced in the presence of cross winds.

A drawback to the wheels known in the art is that solid disc wheels with no spokes are aerodynamically and structurally sound, but offer unacceptable wind resistance when cross wind exists. In circumstances where cross wind does exist, the wheel of choice, therefore, is a spoked wheel. Prior art wheels with spokes, however, have not provided a spoked wheel that is aerodynamically efficient in a head wind as well as a cross wind. Thus, there is a need in the art for providing a high performance, broad application wheel that performs as equally well in heads winds as in cross winds. It, therefore, is an object of this invention to provide an improved high performance, broad application wheel for providing optimum performance in any wind condition, including head winds and cross winds.

SHORT STATEMENT OF THE INVENTION

Accordingly, the wheel of the present invention includes a rim wherein the depth of the rim varies circumferentially and which includes at least one spoke with a first end connected to the rim and a second end connected to a wheel hub wherein the cross-section of the spoke varies from the first end to the second end. The rim depth varies circumferentially so that the depth is greater between the spokes and less at the spoke. Additionally, the spoke cross-section, in a preferred embodiment, is symmetric at the second end and asymmetrical at the first end. In a preferred embodiment, the symmetrical second end is in the shape of an ellipse. The asymmetrical first end contains this same elliptical form as a leading edge while the basic geometric form is a standard airfoil modified to include an elliptical sector trailing edge. This elliptical trailing edge sector of the first end is significantly smaller in dimension than the ellipses of the symmetric second end and the leading edge of the first end.

In another embodiment, the spokes have a variable cross-section so that the first end is symmetric only about a rolling plane of the wheel and the second end is symmetric about a radial plane and the rolling plane of the wheel. Additionally, in a preferred embodiment, the rim varies circumferentially so that the area moment of inertia between the spokes is greater than the area moment of inertia at the first end of the spokes. Further, in a preferred embodiment, the rim and/or spoke(s) is a hollow structure manufactured from multiple nested, tubular braids.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
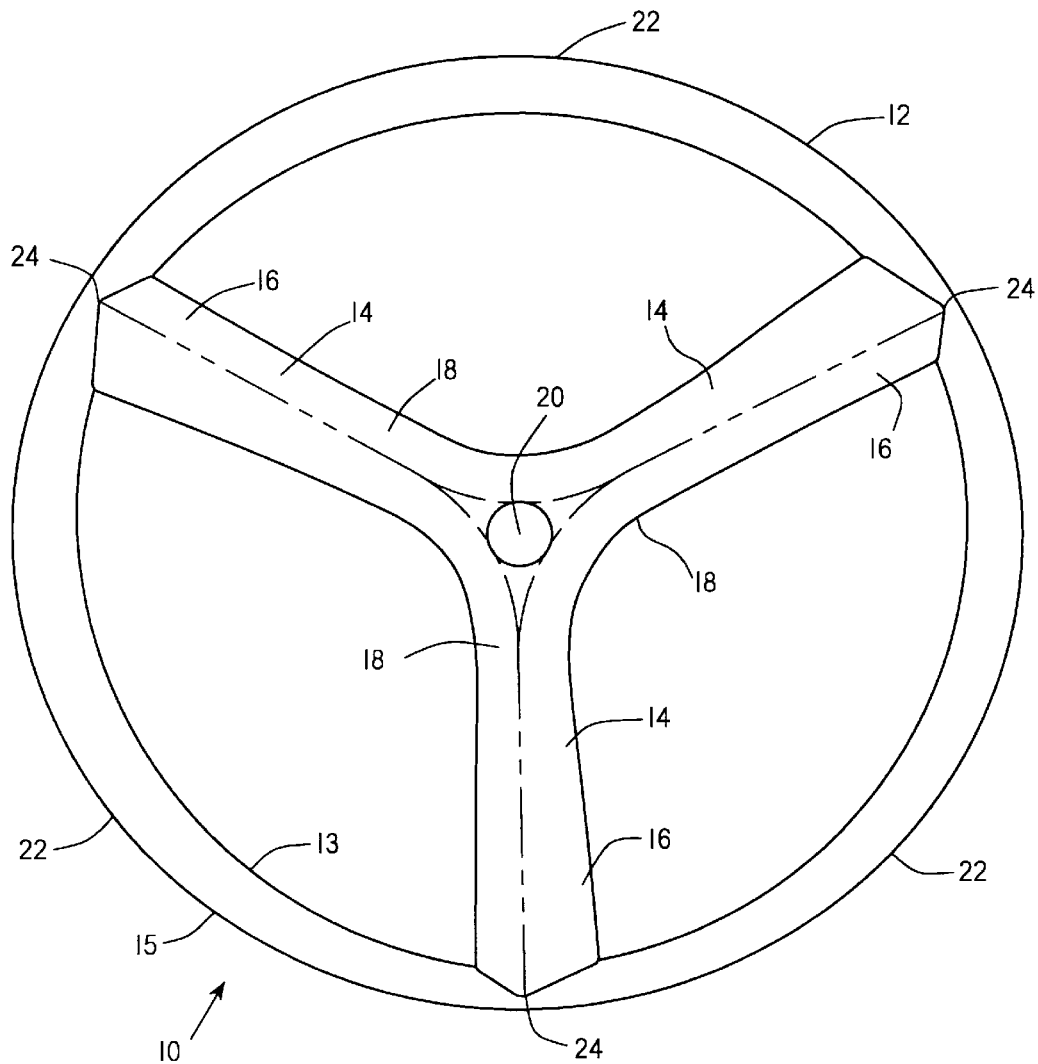
FIG. 1 is a plan view of a preferred embodiment of the high performance, broad application wheel of the present invention.

The preferred embodiment of the present invention is illustrated by way of example in FIGS. 1–8. With specific reference to FIGS. 1 and 2; a high performance, broad application wheel 10 of the present invention, includes rim 12 and spokes 14. Spokes 14 have a first end 16 and a second end 18. First end 16 is connected to rim 12 and second end 18 is connected to wheel hub 20 of any known design and not discussed or disclosed further hereafter. As can be most clearly seen in FIG. 1, rim 12 varies in depth circumferentially. As illustrated in FIG. 1, the depth of rim 12 at point 22 is significantly greater than the depth of the rim 12 at points 24 where spokes 14 first ends 16 connect with rim 12. That is, when measuring around rim 12 in one direction, the depth of rim 12 increases from points 24 to point 22 and then decreases from point 22 to point 24 at the next spoke 14, and so on.

Figure 3:
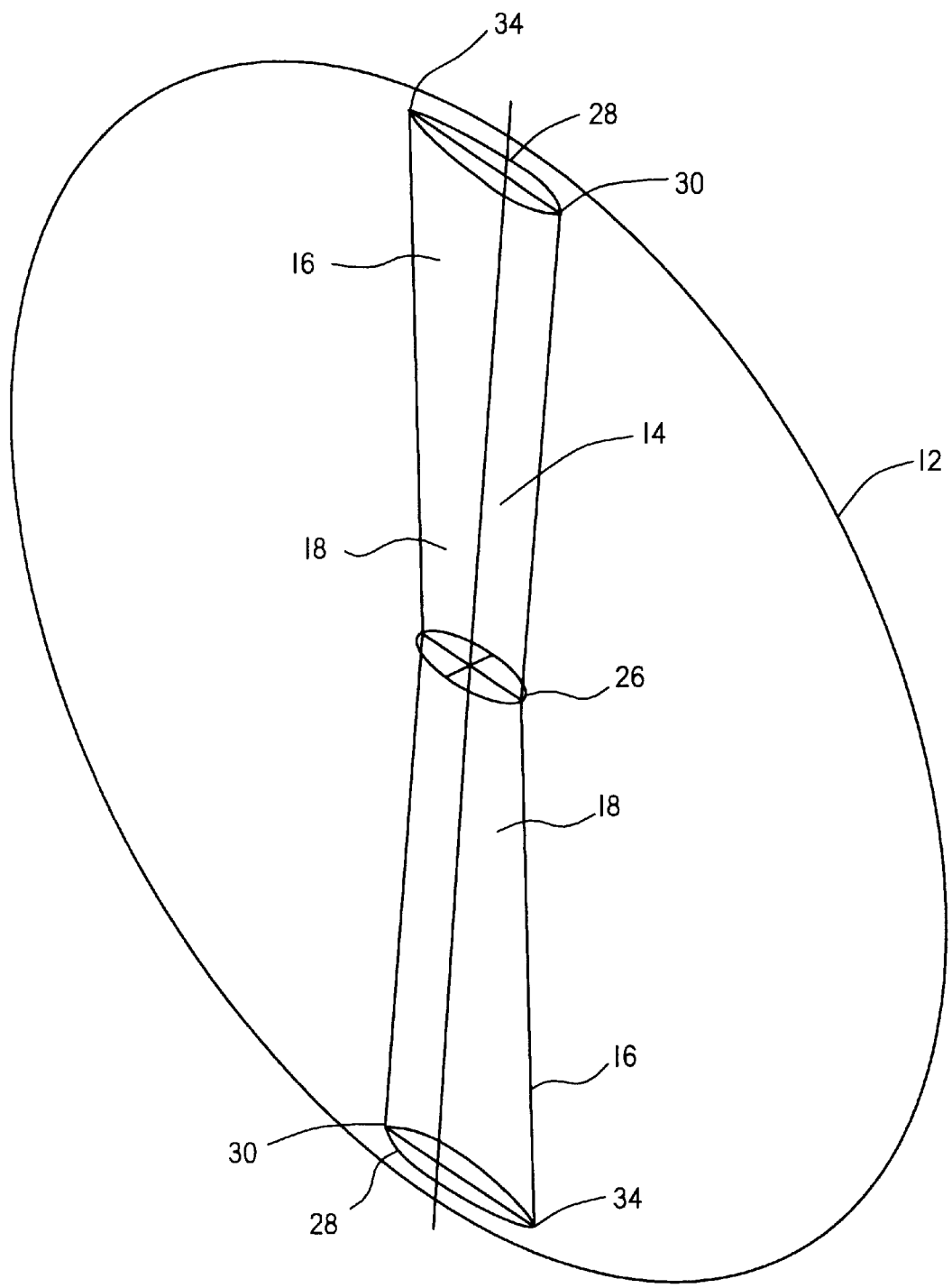
FIG. 3 is a side view illustrating the varying circumference of the spokes of the invention.

Referring to FIG. 3, spokes 14 are illustrated so as to show that spokes 14 are symmetrical in cross-section at point 26, (wheel hub 20) and asymmetrical at point 28, where first end 16 attaches to rim 12. It should be noted that most prior art wheels also require and include a spoke rim flare and/or fillet at point 28, so that a large area of increased wind resistance is present at point 28. To the contrary, spokes 14 have no such increased area and, therefore, normal wind resistance is reduced by spokes 14 at point 28.

Figure 4:
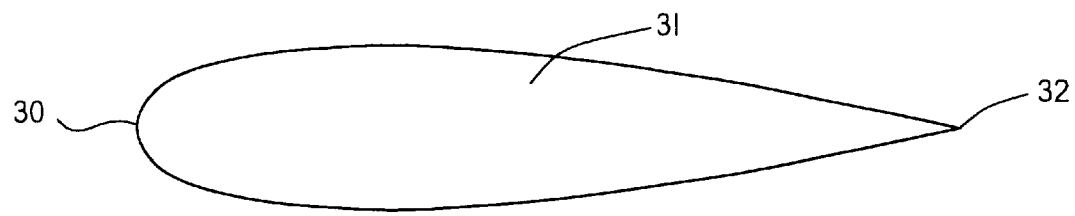
FIG. 4 is a cross-sectional view of prior art spoke shape.

Referring to FIG. 4, a cross-sectional illustration of a prior art spoke is shown. Prior art spokes have a constant cross-sectional geometric form typically of an airfoil shape. These airfoil shapes generally to consist of an elliptical leading edge 30, a tapered after body 31, and a sharp trailing edge 32. The inventors have determined that sharp trailing edge 32 of prior art spokes, rather than helping, actually produces separation and dramatically increases drag in the region of reverse flow. The inventors have determined that this region of reverse flow appears primarily between the wheel hub and the point of ground contact for the wheel.

Figure 5:
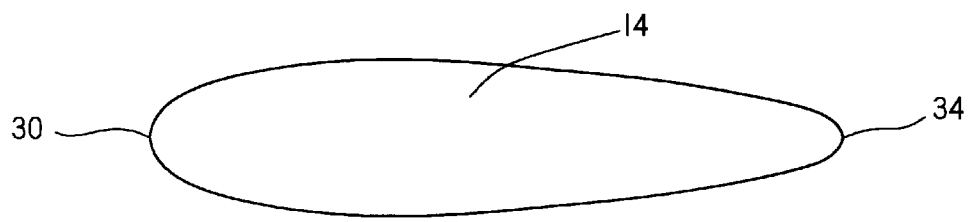
FIG. 5 is a cross-sectional view of the asymetrical first end spoke shape of the invention.
Figure 6:
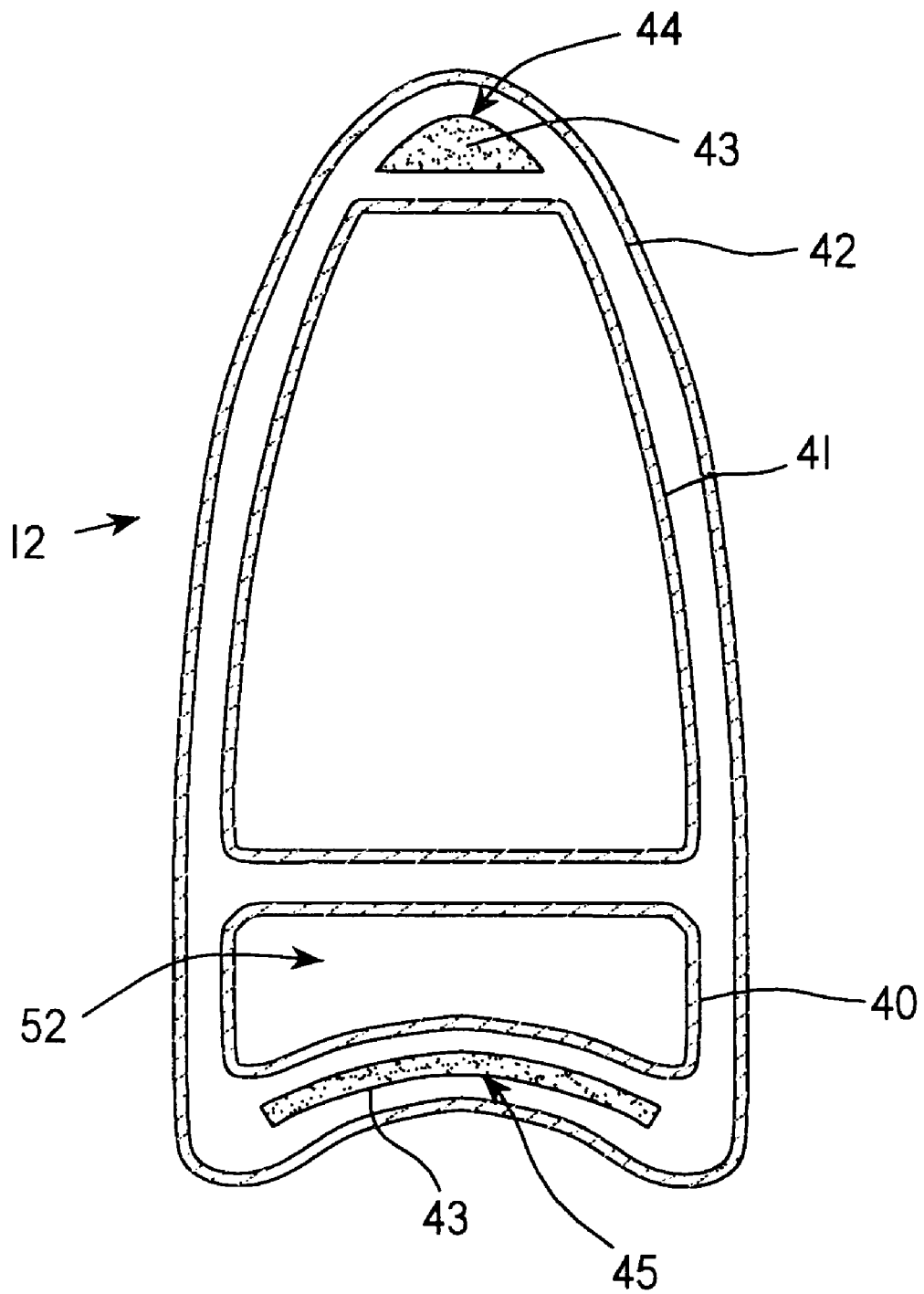
FIG. 6 is a cross-sectional view of a preferred embodiment of the hollow rim of the invention in FIG. 1 with a brake box.

Referring to FIG. 5, Applicant's invention includes, in a preferred embodiment, elliptical leading edge 30 in combination with smaller elliptical trailing edge 34. Referring to FIG. 3, elliptical leading edge 30 is generally constant in shape from second end 18 to first end 16. On the other hand, smaller elliptical trailing edge 34 has the same dimension as elliptical leading edge 30 at the point connection to of wheel hub 20, but has a much smaller elliptical sector at first end 16, reducing across the length of spoke 14 from wheel hub 20 to rim 12. While an elliptical shape is preferred, it is only one of many suitable shapes such as near elliptical, ogive, parabolic, exponential spandrel, quadratic, cubic or other polynomial, and the like.

It should be clear from reference to FIGS. 1, 2, 3, and 5 that spokes 14 have a variable cross section wherein the first end 16 is symmetrical only about the rolling, vertical, plane of high performance, broad application wheel 10. On the other hand, second end 18 of spoke 14 is symmetrical about both the rolling plane and the radial, horizontal, plane of high performance, broad application wheel 10. It should be understood that near symmetry and nearly constant shapes are included in this invention so long as the cross-section varies as required.

Figure 2:
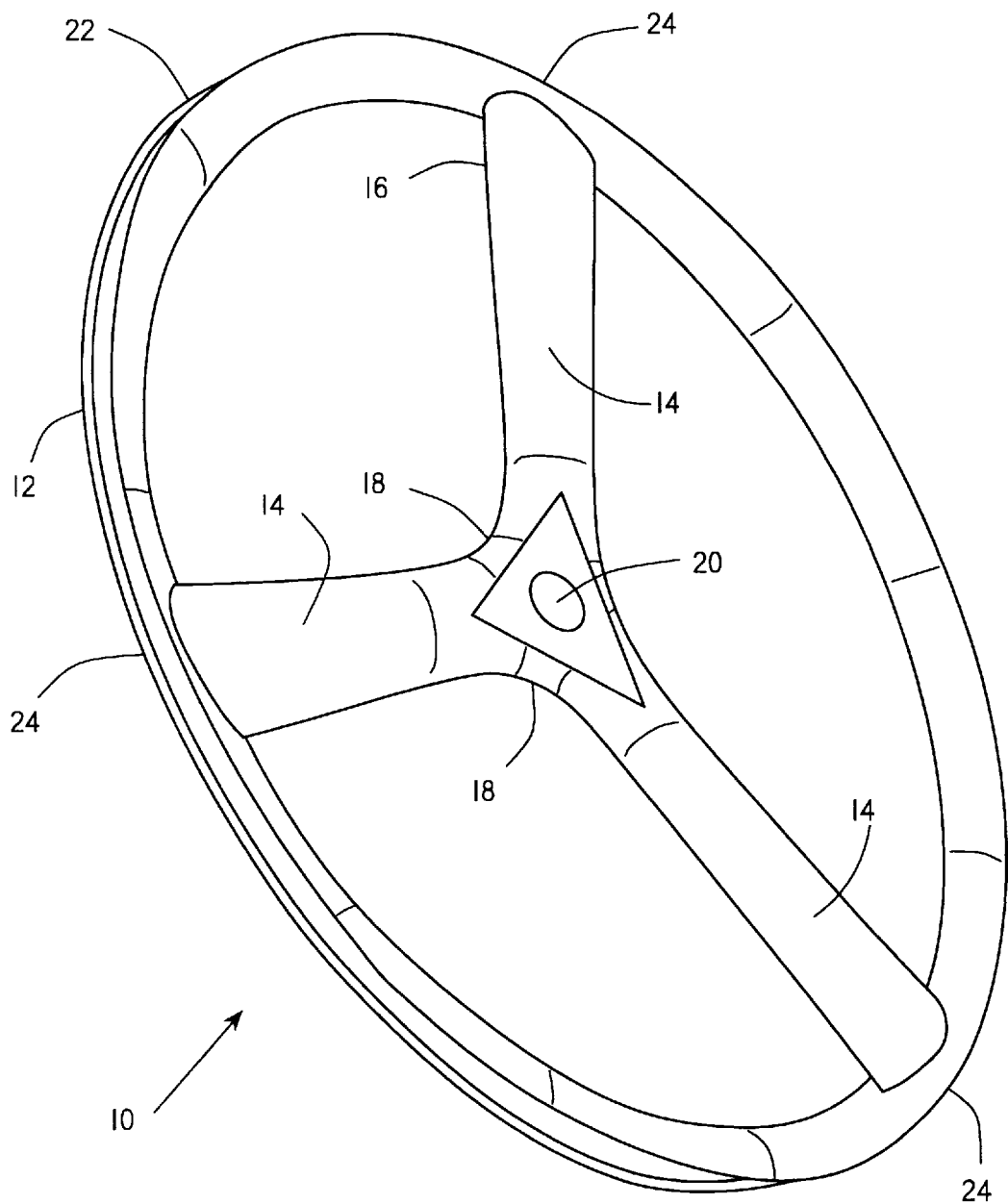
FIG. 2 is a perspective view of the invention in FIG. 1.

Additionally, the inventors have determined that by way of the variance in the circumference of rim 12, rim 12 varies circumferentially so that the area moment of inertia between spokes 14 is greater than the area moment of inertia at the first end 16 of spokes 14. In a preferred embodiment, as shown in FIGS. 1 and 2, three spokes 14 are connected with wheel hub 20 and rim 12.

By way of the present invention, therefore, a high performance, broad application wheel 10 maximizes aerodynamic performance. Additionally, the inventors have determined that wheel 10 levels ride feel, lessens road shock, and saves mass. In fact, contrary to prior art wheels which maximize performance primarily in one category, the inventors have determined that high performance, broad application wheel 10 is best or near best in all varieties of conditions, i.e. calm, head wind and cross wind.

Figure 7:
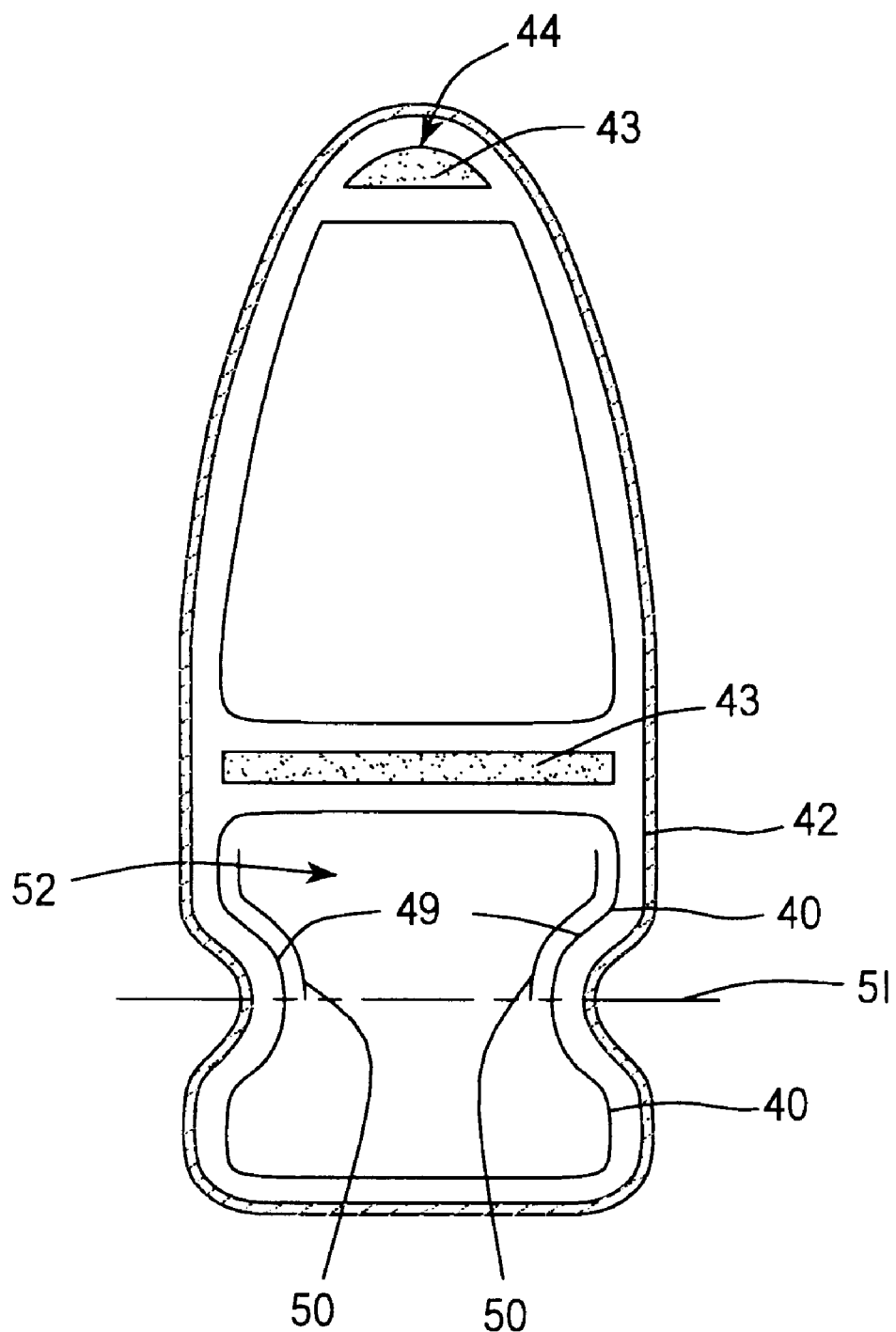
FIG. 7 is a cross-sectional view of a preferred embodiment of the rim of the invention in FIG. 1 with a portion of the brake box cut away as shown in dotted lines for providing a clincher style rim.

In a preferred embodiment, the rim 12 is a hollow structure manufactured from multiple nested tubular braids. As shown in the cross sectional diagram of FIG. 6, the innermost braid 40 forms a box structure 52 which carries the compressive loads applied by a brake caliper (not shown). The braid architecture of this braid is selected to provide an open braid angle suitable for these loads. This "open" braid angle is defined as a braid configuration wherein the braid diameter is at or near the maximum possible which orients the yarns with the circumference of the braid. An optional second inner braid 41 is added for applications where the rim 12 is to be used with tensioned wire spokes. An outer braid 42 forms the outer layer of the rim 12. Braid 42 is of a braid architecture to provide a closed braid angle suitable for the combined bending and torsional loads present in rim 12. This "closed" braid angle is defined as a braid configuration wherein the braid diameter is at or near the minimum possible which aligns the yams with the longitudinal axis of the braid. These braids are reinforced with circumferential charges of unidirectional fiber 43 to enhance flexural stiffness and strength. In a preferred embodiment, these charges are located at the extreme inner diameter 44 and extreme outer diameter 45. For clincher style rims, the position of this outer unidirectional charge 43 must move inward as shown in FIG. 7. A portion of the brake box 52 braid 40 and the outer braid 42 are then removed by machine cut 51 (shown in dotted lines) to create the beads 49 of the clincher rim. Additional filler material 50 may be used in this region to prevent severing of structural plies 40 and 42.

Figure 8:
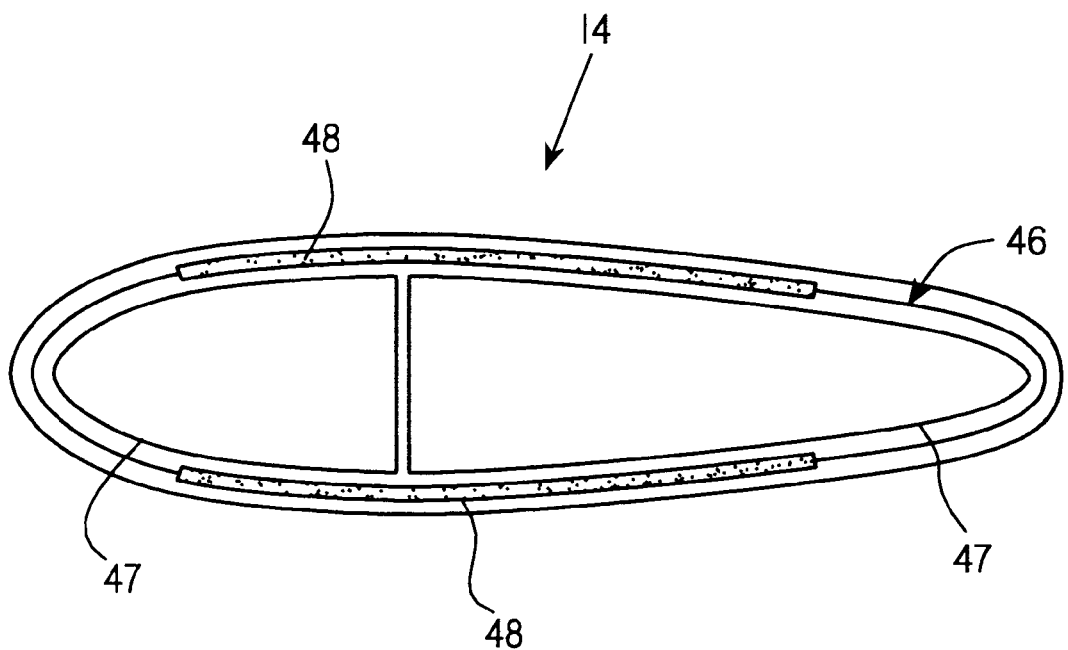
FIG. 8 is a cross-sectional view of the hollow spoke of the invention in FIG. 1.

In a preferred embodiment, the spoke 14 is a hollow structure manufactured from single or multiple tubular braids as shown in FIG. 8. The outer spoke braid 46 is of an architecture to provide a closed braid angle suitable for the combined bending and torsional loads present in spoke 14. The outer braid 46 may be supplemented by optional internal braids 47 to provide a multiple cell, torsion resistant structure. Reinforcement of unidirectional fiber charges 48 can be added on the sides of spoke 14 to enhance lateral stiffness and strength. It should be understood that for either the rim 12 or the spoke(s) 14, the individual braids 40, 41, 42 each possess an independent braid angle, from open to closed, consistent with the intended structural function of the braid within the rim 12 and/or spoke(s) 14.

In a preferred embodiment, the rim 12 and/or spoke 14 is comprised of an all composite carbon graphite material, but any known materials that are sufficiently strong and resilient so as to provide optimal combinations of light weight and minimal rotational inertia, while providing the required strength and stiffness are suitable.

While the wheel of the present invention has been disclosed in connection primarily with bicycles, it should be appreciated that the high performance, broad application wheel can be used with any wheels subjected to air conditions that range from calm to cross wind situations. The present invention provides best or near best performance in all types of situations, thereby eliminating the need for carrying an inventory of wheels designed for peak performance in only one category.

While the present invention has been disclosed in connection with the preferred embodiment thereof, it should be understood that there may be other embodiments which fall within the spirit and scope of the invention as defined by the following claims.

What is claimed is:

1. A wheel with a rim with a depth, measured as the distance between an inside circumference to an outside circumference of said rim, and more than one spoke comprising a rim wherein the depth of said rim varies circumferentially between said more than one spoke so that said rim depth is greater between said more than one spoke.

2. The apparatus of claim 1 wherein said rim with depth further comprises a 17 hollow rim of fibrous, composite construction.

3. The apparatus of claim 1 wherein the depth of said rim varies circumferentially so that the depth increases and decreases between said more than one spoke.

4. The apparatus of claim 1 wherein said rim depth varies circumferentially so that the area moment of inertia between said more than one spoke is greater than the area moment of inertia at said more than one spoke.

5. A wheel with a rim and at least one spoke comprising:
   (a) said at least one spoke with a first end connected to said rim and a second end connected to a wheel hub wherein the cross-section of said at least one spoke varies in geometric form from said first end to said second end;
   (b) wherein said at least one spoke further comprises at least one hollow spoke of fibrous, composite construction; and
   (c) wherein fiber, oriented in a radial direction, is positioned at or near extreme sides of said at least one spoke.

6. The apparatus of claim 5 wherein each of said more than one spoke's cross-section is near symmetric about a horizontal radial plane at said second end and asymmetrical about a horizontal radial plane at said first end and wherein said symmetrical second end is in the shape of an ellipse.

7. The apparatus of claim 6 wherein said more than one spoke has an elliptical leading edge that is constant in dimension from said first end to said second end and an elliptical trailing edge that is the same in dimension as said elliptical leading edge at said second end and thereafter decreased in dimension from said second end to said first end.

8. The apparatus of claim 7 wherein said elliptical leading edge and elliptical trailing edge have modified geometric shapes.

9. A high performance, broad application bicycle wheel comprising:
   (a) a rim wherein the depth of said rim varies circumferentially so that the depth is greater between spokes and less at said spokes; and
   (b) at least three spokes each with a first end connected to said rim and a second end connected to a wheel hub wherein the cross-section of said spokes varies in geometrical form from said first end to said second end.

10. The apparatus of claim 9 wherein said spokes have a variable cross-section so that said first end is symmetric only about a rolling vertical plane of said wheel and said second end is symmetric about both a radial horizontal plane and said rolling vertical plane of said wheel.

11. The apparatus of claim 10 further comprising a spoke cross-section that varies in both geometrical form and dimension from said first end to said second end wherein said spoke cross-section at said second end is an ellipse and wherein said spoke cross-section at said first end is a standard airfoil with a sharp trailing edge modified to form an elliptical trailing edge.

12. A wheel with a rim and at least one spoke comprising:
   (a) said at least one spoke with a first end connected to said rim and a second end connected to a wheel hub wherein the cross-section of said at least one spoke varies in geometric form from said first end to said second end;
   (b) wherein said at least one spoke further comprises at least one spoke of fibrous, composite construction; and
   (c) wherein fiber, oriented in a radial direction, is positioned at or near extreme sides of said at least one spoke.

* * * * *